U. H. DAHLGREN.
DRIVING DEVICE FOR MILKING MACHINES.
APPLICATION FILED APR. 20, 1911.
1,046,446.
Patented Dec. 10, 1912.
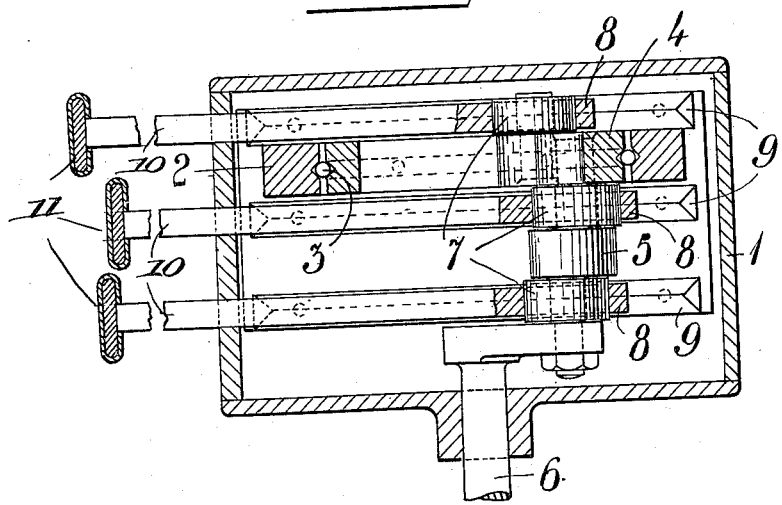
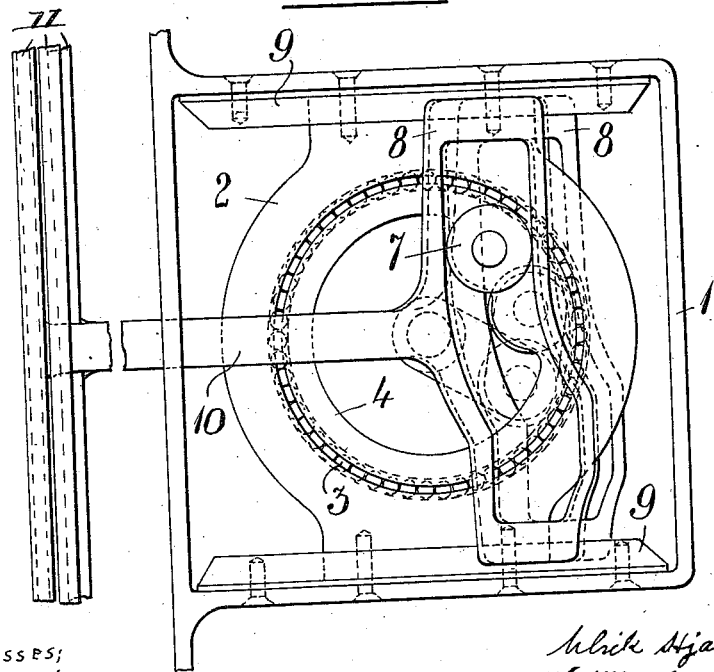
WITNESSES:
INVENTOR

UNITED STATES PATENT OFFICE.

ULRIK HJALMAR DAHLGREN, OF SÖDERTELJE, SWEDEN, ASSIGNOR TO KNUT RUDOLF WESTBERG, OF STOCKHOLM, SWEDEN.

DRIVING DEVICE FOR MILKING-MACHINES.

1,046,446. Specification of Letters Patent. Patented Dec. 10, 1912.

Application filed April 20, 1911. Serial No. 622,322.

*To all whom it may concern:*

Be it known that I, ULRIK HJALMAR DAHLGREN, a subject of the King of Sweden, residing at Södertelje, Sweden, have invented new and useful Improvements in Driving Devices for Milking-Machines, of which the following is a specification.

My invention relates to improvements in driving devices for milking machines.

The object of the invention is to provide a driving device which is specially easy and saves power and space, besides which it enables one to vary the motion of the working parts easily and conveniently.

The characteristics of the invention consist in the combination with two or more horizontal frames arranged above each other and each fixed to a teat working member and moving in guides of a vertical shaft provided with a corresponding number of crank-pins each traveling in its frame.

The invention is illustrated in the annexed drawing.

Figure 1 shows the driving device in vertical section. Fig. 2 shows the same from above, with the upper part or lid removed.

Three horizontal frames 8 are arranged above each other and move on guides 9 on the sides of a casing 1. Each such frame is fitted with a rod 10, which projects outside the casing 1 and is fixed to a teat working member 11. A vertical shaft 6 journaled in the casing 1 and operated by any suitable means is provided with three crank-pins 5 each traveling in its frame 8 by means of a roller 7, ball-bearing or the like. In a bearing 2 in the casing 1 a ring 4, disk, wheel or the like is journaled at its periphery by means of balls 3. The ring 4 is formed integral with one of the crank-pins 5. The ring 4 is co-axial with the shaft 6.

When the shaft 6 is turned in a suitable manner the crank-pins 5 travel in the frames 8, which by this means are caused to move backward and forward on their guides 9, according to the shape of the frames 8. Since the crank-pins 5 occupy different relative positions on shaft 6 the three frames are made to move in different phases in relation to each other.

I claim :—

In a driving device for milking machines, in combination, a plurality of movable horizontal frames arranged one above the other, each of said frames being provided with a teat working member, a plurality of horizontally disposed guides for guiding the movements of said frame, and a vertical shaft provided with a plurality of crank pins for actuating said frames, there being a separate crank pin for each frame, said crank pins being differently positioned relatively to said shaft, whereby said frames will be moved in different phase relations.

In testimony whereof I have signed my name to this specification in the presence of two subscribing witnesses.

ULRIK HJALMAR DAHLGREN.

Witnesses:
 JOHAN FREDRIK ALARIK RUTLIGCK,
 HEDING MELINDER.

Copies of this patent may be obtained for five cents each, by addressing the "Commissioner of Patents, Washington, D. C."